United States Patent [19]

Elenberger

[11] 3,739,478

[45] June 19, 1973

[54] STEERING WHEEL MOUNTED CLIPBOARD

[76] Inventor: Richard V. Elenberger, 7480 Bradburn Boulevard, Westminister, Colo. 80030

[22] Filed: Feb. 8, 1972

[21] Appl. No.: 224,564

[52] U.S. Cl. .................................. 33/75 R, 108/44
[51] Int. Cl. ............................................... B43l 5/00
[58] Field of Search ................ 280/150; 292/303; 33/75, 78; 24/67.5, 67.7; 108/44, 45; 281/1

[56] References Cited
UNITED STATES PATENTS

| | | | |
|---|---|---|---|
| 2,150,709 | 3/1939 | Bake | 24/67.7 |
| 397,147 | 2/1889 | Sperry | 33/78 |
| 2,407,893 | 9/1940 | Meyer | 33/1 SD |
| 3,271,866 | 9/1966 | Gruber et al | 33/76 VA |
| 2,532,537 | 12/1950 | Brown | 33/78 |

FOREIGN PATENTS OR APPLICATIONS

| | | | |
|---|---|---|---|
| 1,122,364 | 8/1968 | Great Britain | 108/44 |

*Primary Examiner*—Harry N. Haroian
*Attorney*—Hyman Berman, Stanford W. Berman and Theodore Bishoff et al.

[57] ABSTRACT

A clipboard for detachable connection to the steering wheel of an automobile to provide a firm base for the preparation of field sketches and notes in a motor vehicle. The clipboard includes a circular base plate having adjustable spring clips secured thereto for snapping over a steering wheel. A circular board is secured to the base plate by means of an axial pivot pin to permit the board to rotate on the plate. A spring pressed clamp is provided on the edge of the board for securing papers to the board. An optional feature provides a protractor on the board for use of an engineer in making field sketches.

4 Claims, 6 Drawing Figures

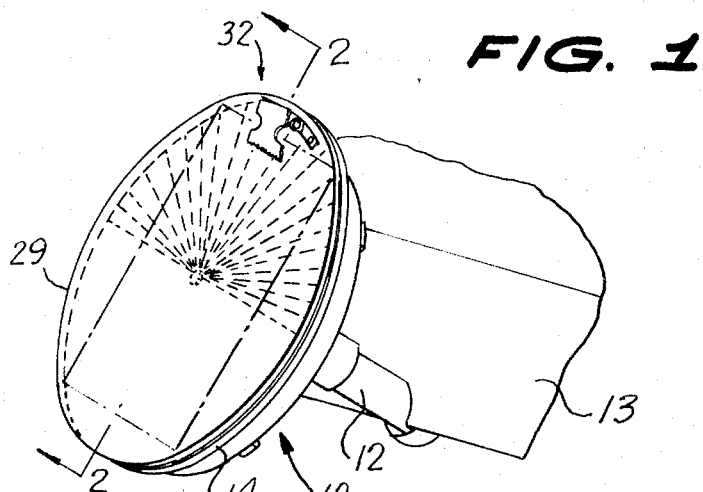
FIG. 1
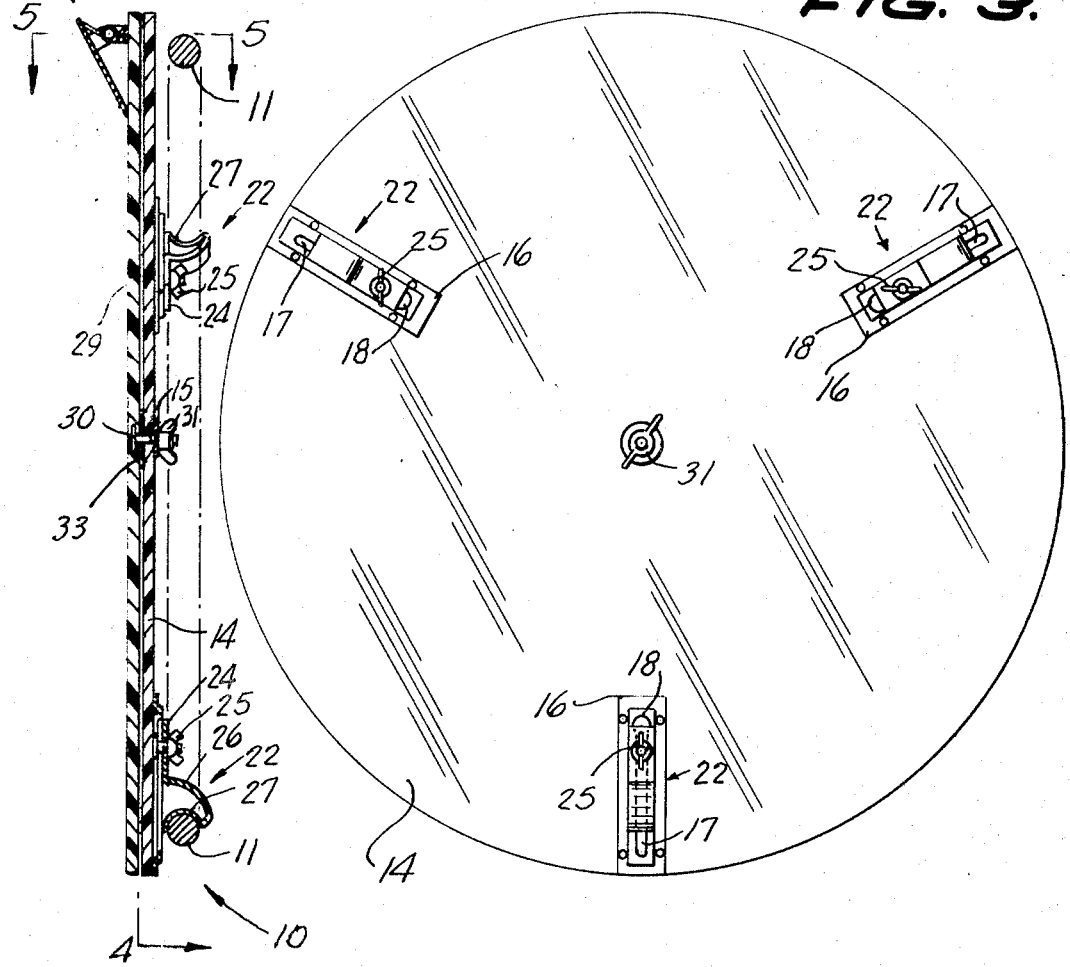

STEERING WHEEL MOUNTED CLIPBOARD

BACKGROUND OF THE INVENTION

Field of the Invention

The present invention relates to a field clipboard particularly adapted for the use of engineers.

SUMMARY OF THE INVENTION

A field clipboard consisting of two circular members pivotally secured together with one of the members having adjustable spring clips for clipping it to the steering wheel of an automobile and the other of the members having a spring pressed clamp for securing the papers to the upper surface thereof.

The primary object of the invention is to provide an engineer's clipboard supported on the steering wheel of an automobile to provide a solid base.

Other objects and advantages will become apparent in the following specification when considered in the light of the attached drawings.

BRIEF DESCRIPTION OF THE DRAWINGS

FIG. 1 is a perspective view of the invention;

FIG. 2 is an enlarged vertical cross section taken along the Line 2—2 of FIG. 1 looking in the direction of the arrows;

FIG. 3 is a rear elevation of the invention;

DESCRIPTION OF THE PREFERRED EMBODIMENT

Figure 4:
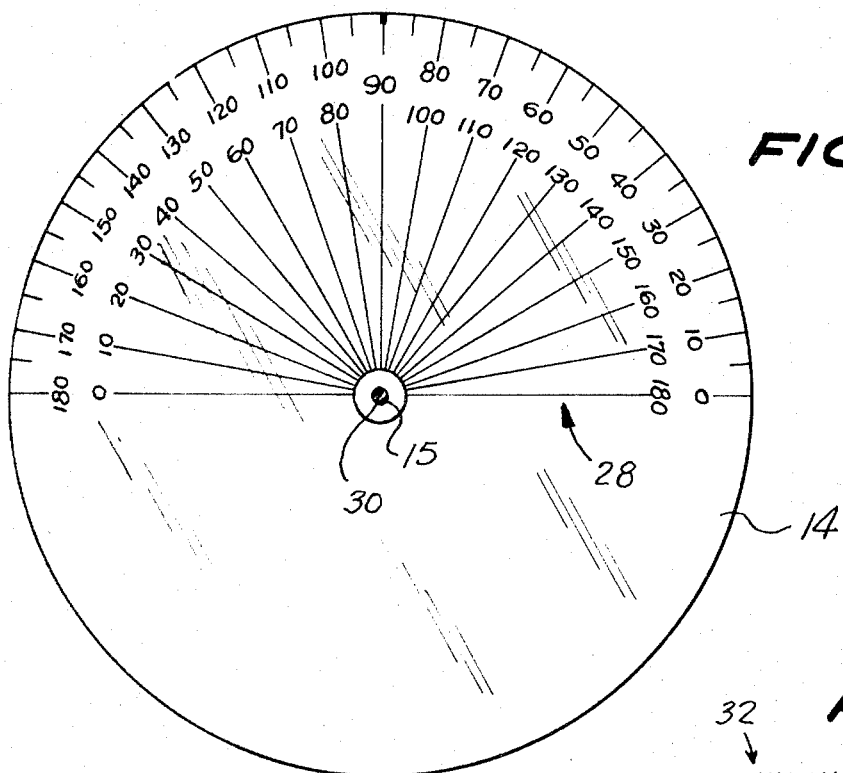
FIG. 4 is a transverse sectional view taken along the Line 4—4 of FIG. 2 looking in the direction of the arrows.
Figure 5:
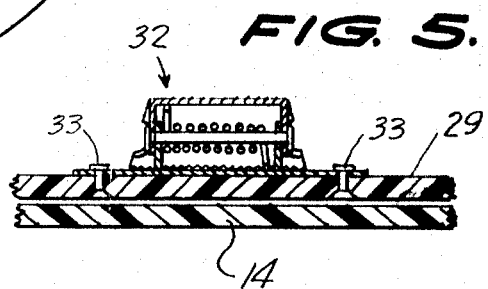
FIG. 5 is an enlarged fragmentary transverse sectional view taken along the Line 5—5 of FIG. 2 looking in the direction of the arrrows.
Figure 6:
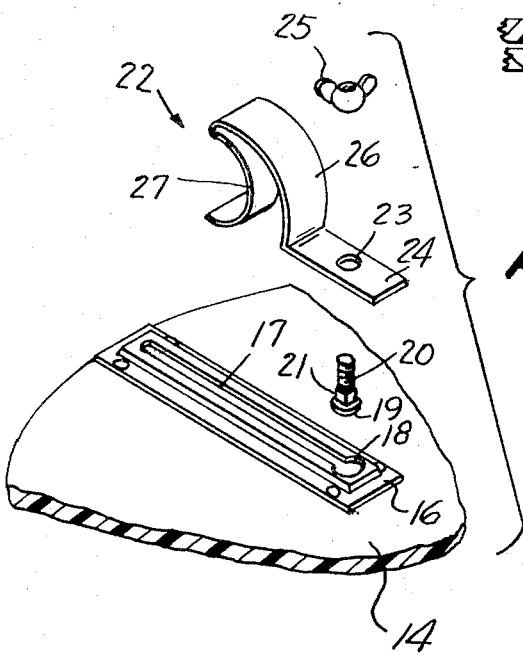
FIG. 6 is an enlarged fragmentary perspective view of one of the spring clips and its adjustable connection to the base plate.

Referring now to the drawings in detail wherein like reference characters indicate like parts throughout the several figures, the references numeral 10 indicates generally a clipboard constructed in accordance with the invention.

The clipboard 10 is adapted to be detachably secured to a steering wheel 11 mounted on a steering post 12 which is supported in a dashboard 13 of a motor vehicle by conventional means.

The clipboard 10 includes a flat, circular base plate 14 having an axial bore 15 extending therethrough. The underside of the base plate 14 is provided with a plurality of radially extending, circumferentially equi-spaced brackets 16 with each of the brackets 16 having an elongate slot 17 extending longitudinally thereof to lie on a radius of the plate 14. The slot 17 has an enlarged aperture 18 at one end thereof to permit the head 19 of a carriage bolt 20 to be inserted therethrough. The carriage bolt 20 has a square shank 21 which slidably engages in the slot 17 but is restrained from rotating therein.

A spring clip generally indicated at 22 is engaged against the bracket 16 and has a bore 23 formed in a flat portion 24 thereof to engage over the carriage bolt 20. A wing nut 25 is threaded onto the bolt 20 to clamp the flat portion 24 to the bracket 16. An arcuate spring arm 26 is integrally formed with the flat portion 24 of the spring clip 22 and extends upwardly and outwardly therefrom. An arcuate jaw 27 is integrally joined to the outer end of the arm 26. The jaw 27 is adapted to engage the inner side of the steering wheel 11 as can be seen in the lower portion of FIG. 2.

In attaching the base plate 14 to the steering wheel 11 the wing nuts 25 are loosened and the spring clips 22 are moved inwardly to permit the base plate 14 to be centered on the steering wheel 11. The spring clips 22 are then moved outwardly until each of the jaws 27 are in contact with the steering wheel 11 whereupon the wing nuts 25 are tightened to maintain the spring clips 22 in their adjusted position. With the spring clips 22 in their adjusted position. With the spring clips 22 in their adjusted position the base plate 14 can be snapped on and off of the steering wheel 11 without the necessity of further adjustments of the spring clips 22. In the event that the clipboard 10 is to be used on a steering wheel of a different circumference, the spring clips 22 are again adjusted as described above.

The board 14 has protractor forming indicia generally indicated at 28 printed on the upper surface thereof when such is found to be desirable.

A circular transparent plastic board 29 having a diameter equal to the diameter of the plate 14 is pivotally secured to the plate 14 by means of an axially pivot bolt 30 extending therethrough. A wing nut 31 secures the pivot bolt 30 to the board 29 and plate 14. A pivoted spring clamp generally indicated at 32 is secured to the board 29 by means of rivets 33. The spring clamp 32 is adapted to hold papers and other materials on the upper face of the board 29. A plastic washer 33 separates the plate 14 and board 29 to reduce the contact therebetween.

With the plate 14 releasably clamped to the steering wheel 11 paper for making field sketches and/or notes is secured under the clamp 32 to the face of the board 29 to permit drawings and notes to be made with a firm support for the board 29. Rotation of the board 29 with respect to the plate 14 permits angles to be drawn utilizing the protractor 28 as a guide.

Having thus described the preferred embodiments of the invention, it should be understood that numerous structural modifications and adaptations may be resorted to without departing from the spirit of the invention.

What is claimed is:

1. A clipboard for detachable connection to the steering wheel of an automobile, comprising a base plate, a plurality of spring clips, means securing said spring clips to said base plate for radial adjustment thereon, a board, means pivotally securing said board to said plate for rotational adjustment about an axis perpendicular to said board and said plate, and means for detachably securing paper to said board, said means for securing said spring clips to said plate comprising a plurality of circumferentially equi-spaced radially extending brackets secured to said plate with each of said brackets having a slot extending radially with respect to said plate and a bolt slidably mounted in said slot and detachably secured to said spring clip.

2. A device as claimed in claim 1 wherein the means for securing papers to said board comprises a spring hinged clamp secured to the edge of said board.

3. A device as claimed in claim 1 wherein said base plate and said board are circular and have substantially the same diameter.

4. A device as claimed in claim 1 wherein said board is formed of transparent plastic and a protractor is printed on the upper surface of said plate to be visible through said board.

* * * * *